(12) United States Patent
Motoyama

(10) Patent No.: US 7,042,481 B2
(45) Date of Patent: May 9, 2006

(54) LASER EXPOSING APPARATUS

(75) Inventor: Hajime Motoyama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/621,417

(22) Filed: Jul. 18, 2003

(65) Prior Publication Data

US 2004/0017468 A1    Jan. 29, 2004

(30) Foreign Application Priority Data

Jul. 29, 2002    (JP)    ............... 2002-219760

(51) Int. Cl.
*B41J 2/435*    (2006.01)

(52) U.S. Cl. ...................... 347/234; 347/248
(58) Field of Classification Search .......... 347/25–261; 359/204; 372/43, 107
See application file for complete search history.

(56) References Cited

U.S. PATENT DOCUMENTS

| | | | |
|---|---|---|---|
| 5,371,526 A * | 12/1994 | Appel et al. ................. | 347/239 |
| 5,576,752 A | 11/1996 | Kovacs et al. .............. | 347/238 |
| 5,739,940 A * | 4/1998 | Kondo ........................ | 359/204 |
| 6,437,816 B1 * | 8/2002 | Fujita et al. ................. | 347/233 |
| 6,798,820 B1 * | 9/2004 | Okuwaki et al. ........... | 372/107 |
| 2001/0050933 A1 * | 12/2001 | Takahashi et al. ........... | 372/43 |
| 2002/0097659 A1 | 7/2002 | Furuhata et al. ....... | 369/112.04 |

FOREIGN PATENT DOCUMENTS

EP    1 134 966    9/2001

\* cited by examiner

*Primary Examiner*—Hai Pham
(74) *Attorney, Agent, or Firm*—Fitzpatrick, Cella, Harper & Scinto

(57) ABSTRACT

A laser exposing apparatus has a first laser source emitting a first laser beam, a second laser source emitting a second laser beam shorter in wavelength than the first laser beam, and an optical device for directing the first laser beam and the second laser beam to a photosensitive member. The second laser beam has a longer optical path length to the photosensitive member than the first laser beam.

4 Claims, 6 Drawing Sheets

LASER EXPOSING APPARATUS

BACKGROUND OF THE INVENTION

1. Field of the Invention

This invention relates to a laser exposing apparatus for use in an image forming apparatus such as a copying machine or a printer using an electrophotographic process.

2. Description of the Related Art

Apparatuses for effecting image exposure by a laser beam modulated in conformity with image information has spread.

In such an apparatus, the higher speed of the apparatus can be achieved by exposing a photosensitive member by a plurality of laser beams.

FIG. 1 of the accompanying drawings shows a conventional construction. FIG. 1 is a plan view, and FIG. 2 of the accompanying drawings is a side view. In FIGS. 1 and 2, the reference numeral 15 designates a rotary polygon mirror, and the reference numeral 16 denotes a laser scanner motor for rotatively driving the rotary polygon mirror 15. As the rotary polygon mirror 15, use is made of a hexagonal one. The reference numeral 17 designates a laser diode which is a light source for recording. The laser diode 17 is a two-beam laser diode generating two laser beams from a stem. The laser diode 17 is turned or turned off in conformity with an image signal by a laser driver, not shown, and the light-modulated laser beams emitted from the laser diode 17 are applied toward the rotary polygon mirror 15 through a collimator lens 20. The rotary polygon mirror 15 is rotated in the direction of arrow, and the laser beams emitted from the laser diode 17 are reflected as deflected beams continuously changed in angle with the rotation of the rotary polygon mirror 15 by the reflecting surface thereof. These reflected lights are subjected to the correction of distortion aberration by an f-θ lens 21, and scan in the main scanning direction of a photosensitive drum 10 via a reflecting mirror 18. At this time, one beam corresponds to the scanning of one line, and by the scanning of one surface of the rotary polygon mirror 15, two lines scan in the main scanning direction of the photosensitive drum 10.

The photosensitive drum 10 is electrified in advance by an electrifier 11, and is sequentially exposed by the scanning of the laser beams, whereby an electrostatic latent image is formed. Also, the photosensitive drum 10 is rotated in the direction of arrow, and the electrostatic latent image formed thereon is developed by a developing device 12, and the developed visible image is transferred to a transferring sheet, not shown, by a transferring electrifier 13. The transferring sheet to which the visible image has been transferred is conveyed to a fixing device 14, where fixing is effected, whereafter the transferring sheet is discharged out of the image forming apparatus.

Also, a BD sensor 19 is disposed at a location near or corresponding to a scanning start position in the main scanning direction on the side of the photosensitive drum 10. The laser beam reflected by each reflecting surface of the rotary polygon mirror 15 is detected by the BD sensor 19 prior to the scanning of the line. The detected BD signal is inputted to a timing controller, not shown, as a scanning start reference signal in the main scanning direction, and with this signal as the reference, the synchronization of a writing start position of each time in the main scanning direction is taken.

In the above-described example of the prior art, however, the distance from the light emitting surface of the laser to the photosensitive member has differed between the two laser beams, and an evil thereby has occurred. An optical path at this time is shown in FIG. 3 of the accompanying drawings.

In FIG. 3, the same reference numerals as those in FIG. 1 designate the same members. In FIG. 3, the letters A and B designate the centers of the two beams, respectively. Usually, in an electrophotographic apparatus, in order to prevent a laser beam applied to a photosensitive member from being reflected, returning reversely along an optical path, and being again applied to a laser diode chip to thereby destroy the chip, use is made of oblique incidence in which the laser beam is obliquely applied to the surface of the photosensitive member as shown so that the reflected light may not return. As the result, however, in the case of a system in which a plurality of lines are scanned at a time by a plurality of laser beams, the lengths of optical paths have become different therebetween. In this example, the optical path B is longer than the optical path A.

The evil at this time is shown in FIG. 4 of the accompanying drawings. In FIG. 4, the same reference numerals as those in FIG. 1 designate the same members. In FIG. 4, A and B show that images scanned from the polygon mirror 15 to the photosensitive member 10 through the f-θ lens 21 differ in magnification from each other, and the image scanned by the beam A is smaller in magnification than the image scanned by the beam B. Consequently, if at this time, one and the same straight line is printed, there will occur an evil which becomes such as shown in FIG. 5 of the accompanying drawings.

However, it is very difficult to adjust the wavelengths of the laser beams A and B within a range of several nm in the manufacturing process of a laser chip, and it is usual that the relative difference between the wavelengths of A and B becomes different at a probability of 50%. Consequently, when the wavelengths of A and B are selectively used, there has occurred an evil that cost becomes very high.

SUMMARY OF THE INVENTION

It is an object of the present invention to provide a laser exposing apparatus in which even if the wavelengths of laser beams differ from each other, the magnifications thereof coincide with each other.

It is another object of the present invention to provide a laser exposing apparatus which is adjustable so that the imaging magnifications of two laser beams may coincide with each other.

It is still another object of the present invention to provide a laser exposing apparatus having:

a first laser source emitting a first laser beam;

a second laser source emitting a second laser beam shorter in wavelength than the first laser beam; and optical means for directing the first laser beam and the second laser beam to a photosensitive member;

the second laser beam having a longer optical path length to the photosensitive member than the first laser beam.

Further objects of the present invention will become apparent from the following description.

DESCRIPTION OF THE PREFERRED EMBODIMENT

An embodiment of the present invention will hereinafter be described with reference to the drawings.

Figure 10:
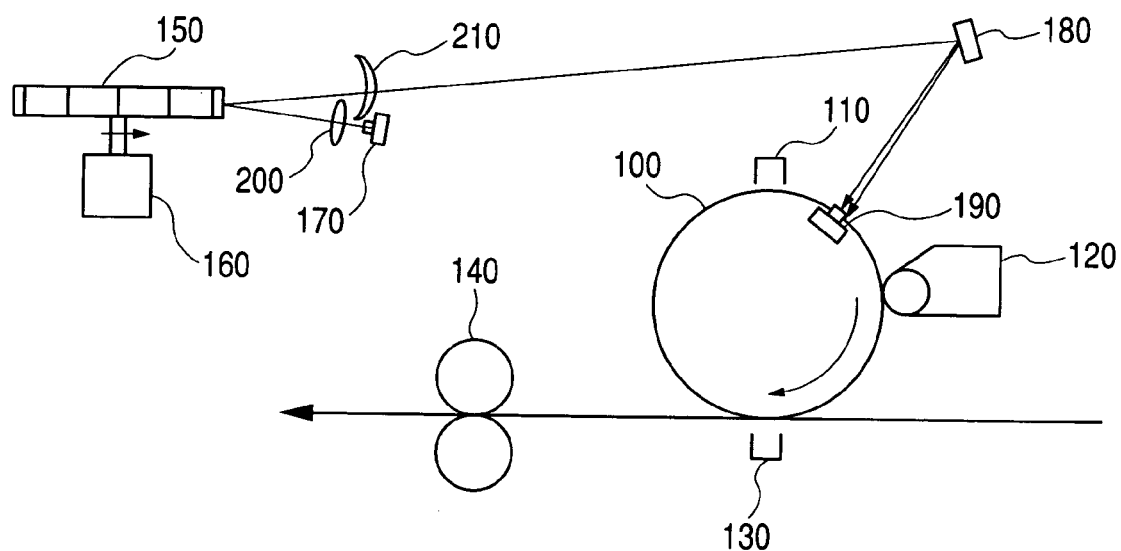
FIG. 10 is a schematic view showing an image forming apparatus using a laser exposing apparatus according to the embodiment of the present invention.

FIG. 10 is a schematic view showing the essential portions of an image forming apparatus using a laser exposing apparatus according to the embodiment of the present invention.

In FIG. 10, the reference numeral 150 designates a rotary polygon mirror, and the reference numeral 160 denotes a laser scanner motor for rotatively driving the rotary polygon mirror 150. A bushless DC motor is used herein. As the rotary polygon mirror 150, use is made of a hexagonal one. In the present embodiment, use is made of the rotary polygon mirror 150 made polygonal like this.

A laser diode 170 which is a light source for recording is a two-beam laser diode of a monolithic type which generates two laser beams from a stem. The laser diode 170 is turned on or turned off in conformity with an image signal by a laser driver, not shown, and the light-modulated laser beams emitted from the laser diode 170 are applied toward the rotary polygon-mirror 150 through a collimator lens 200.

The rotary polygon mirror 150 is rotated in the direction of arrow, and the laser beams emitted from the laser diode 170 are reflected as deflected beams continuously changed in angle with the rotation of the rotary polygon mirror 150 by the reflecting surface thereof. These reflected lights are subjected to the correction or the like of distortion aberration by an f-θ lens 210, and are incident on a photosensitive drum 100 obliquely from above it via a reflecting mirror 180, and scan in a main scanning direction. At this time, one beam corresponds to the scanning of one line, and by the scanning of one surface of the rotary polygon mirror 150, two lines scan in the main scanning direction of the photosensitive drum 100.

The photosensitive drum 100 is electrified in advance by an electrifier 110, and is sequentially exposed by the scanning of the laser beams, whereby an electrostatic latent image is formed. The photosensitive drum 100 is rotated in the direction of arrow, and the electrostatic latent image formed thereon is developed by a developing device 120, and the developed visible image is transferred to a transferring sheet, not shown, by a transferring electrifier 130. The transferring sheet to which the visible image has been transferred is conveyed to a fixing device 140, where fixing is effected, whereafter the transferring sheet is discharged out of the image forming apparatus.

Also, a BD sensor 190 is disposed at a location near or corresponding to a scanning start position in the main scanning direction on the side of the photosensitive drum 100. The laser beam reflected by each reflecting surface of the rotary polygon mirror 150 is detected by the BD sensor 190 prior to the scanning of the line. The detected BD signal is inputted to a timing controller, not shown, as a scanning start reference signal in the main scanning direction, and with this signal as the reference, the synchronization of the writing start position of each line in the main scanning direction is taken.

Figure 7:
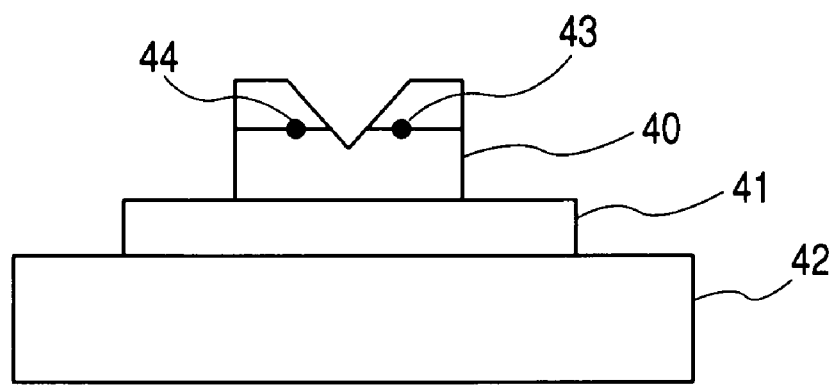
FIG. 7 shows a laser diode chip used in the present invention.

FIG. 7 is a view of a two-beam laser chip of a monolithic type used as a light source in the present embodiment as it is seen from its light emitting surface. In FIG. 7, the reference numeral 40 designates a laser diode chip, and the reference numerals 43 and 44 denote the light emitting points of respective lasers. The interval between the light emitting points 43 and 44 is generally of the order of 100 µm. The reference numeral 41 designates a sub-mount. The reference numeral 42 denotes a heat sink connected to a housing.

Figure 8:
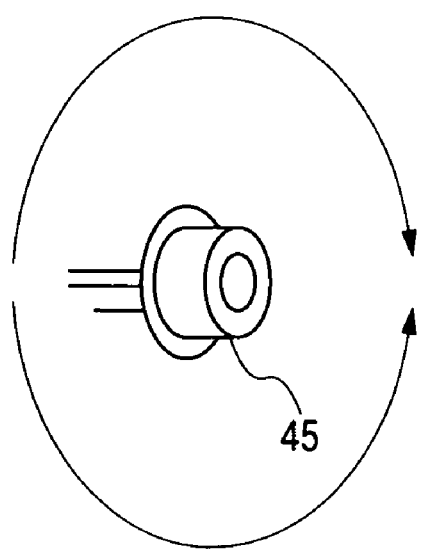
FIG. 8 shows the appearance of the step of a laser diode used in the present invention.

FIG. 8 shows a laser diode element having this laser chip contained in a stem (support member) 45. By this laser diode element being rotated as indicated by arrow, the optical paths of the laser beams are selected.

Figure 9A:
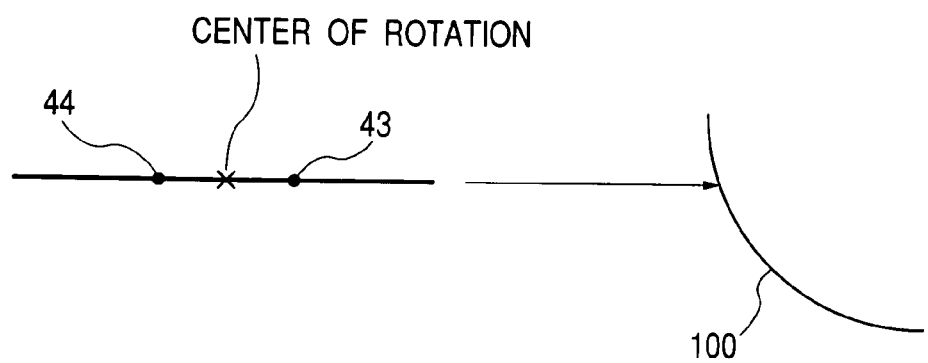
FIGS. 9A, 9B and 9C show an embodiment of the present invention.

The selecting step will now be described in detail with reference to FIGS. 9A, 9B and 9C. FIG. 9A shows a case where a straight line linking the light emitting points 43 and 44 together is horizontal, and the light emitting points 43 and 44 both scan on the same photosensitive member 100.

Actually the two laser beams must scan two lines and therefore, when an image having resolution of e.g. 600 DPI is to be formed, the interval between two scanning lines on the photosensitive member must be designed to be about 42.3 µm. In order to adjust this interval, the laser diode is rotated about the center of rotation in the figure. This is shown in FIG. 9B. In FIG. 9B, the laser diode is rotated by an angle of +θ so that the laser beam generated from the laser beam emitting point 43 may have a short optical path A to the photosensitive member 100 and that the laser beam generated from the laser beam emitting point 44 may have a long optical path B to the photosensitive member 100, whereby it becomes possible to adjust the interval between the two scanning lines so as to be about 42.3 µm.

Figure 1:
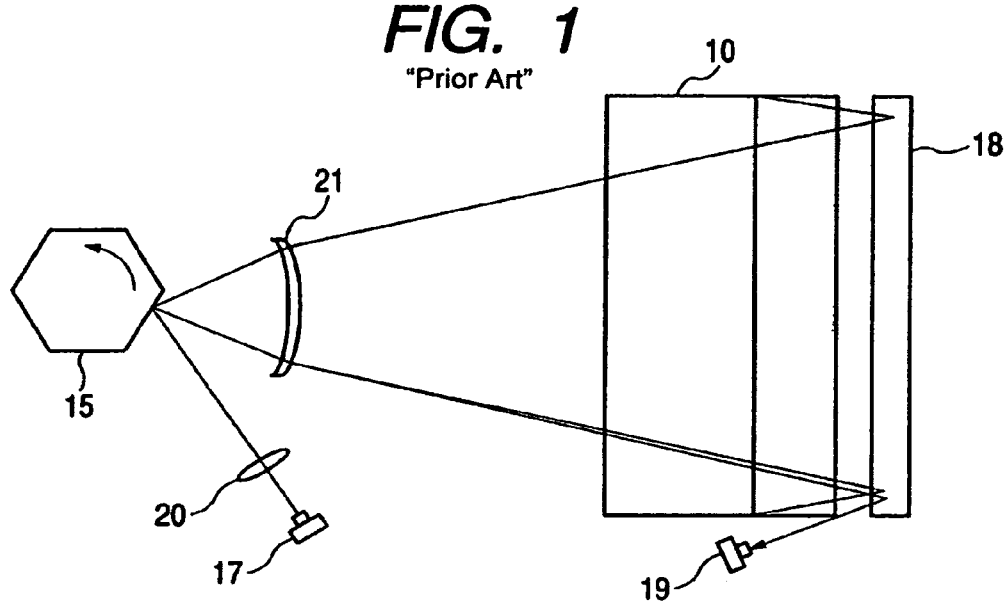
FIG. 1 is a plan view of the construction of a laser exposing apparatus.
Figure 2:
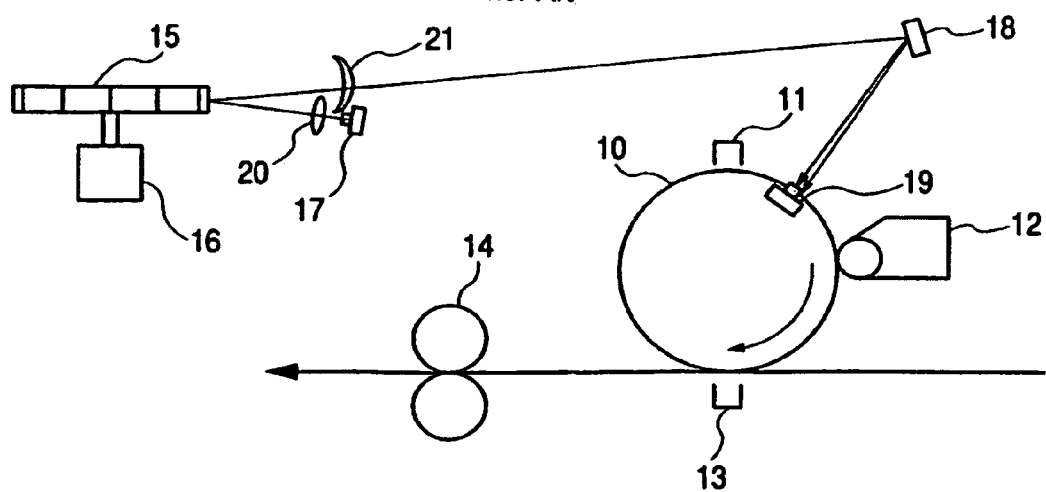
FIG. 2 is a side view of the construction of the laser exposing apparatus shown in FIG. 1.
Figure 3:
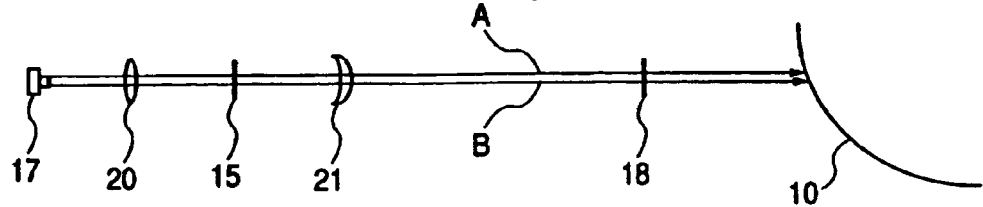
FIG. 3 shows the optical path of the construction of the laser exposing apparatus shown in FIG. 1.
Figure 4:
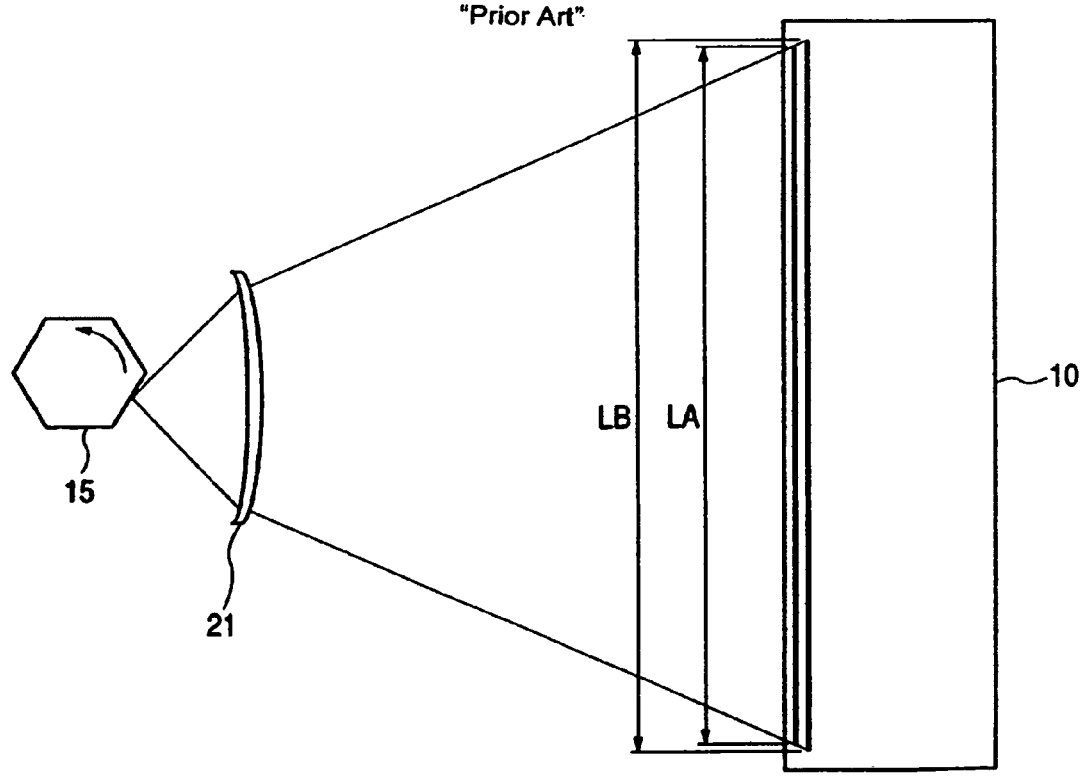
FIG. 4 illustrates the inconvenience of the laser exposing apparatus shown in FIG. 1.
Figure 5:
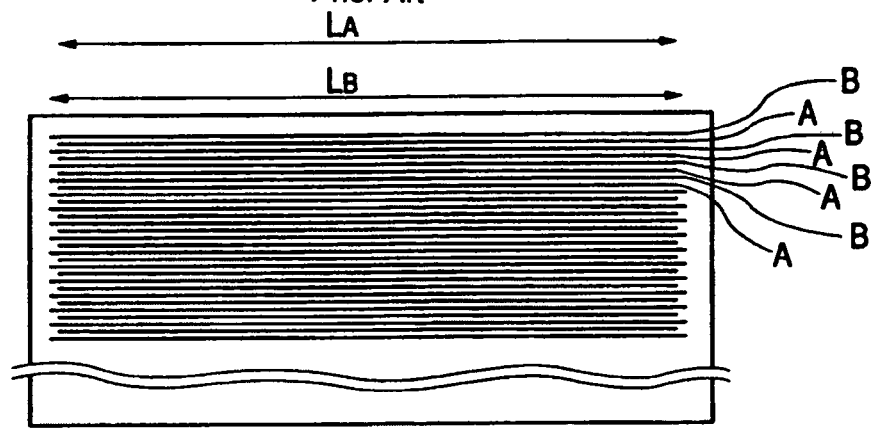
FIG. 5 shows a printing state.
Figure 6:
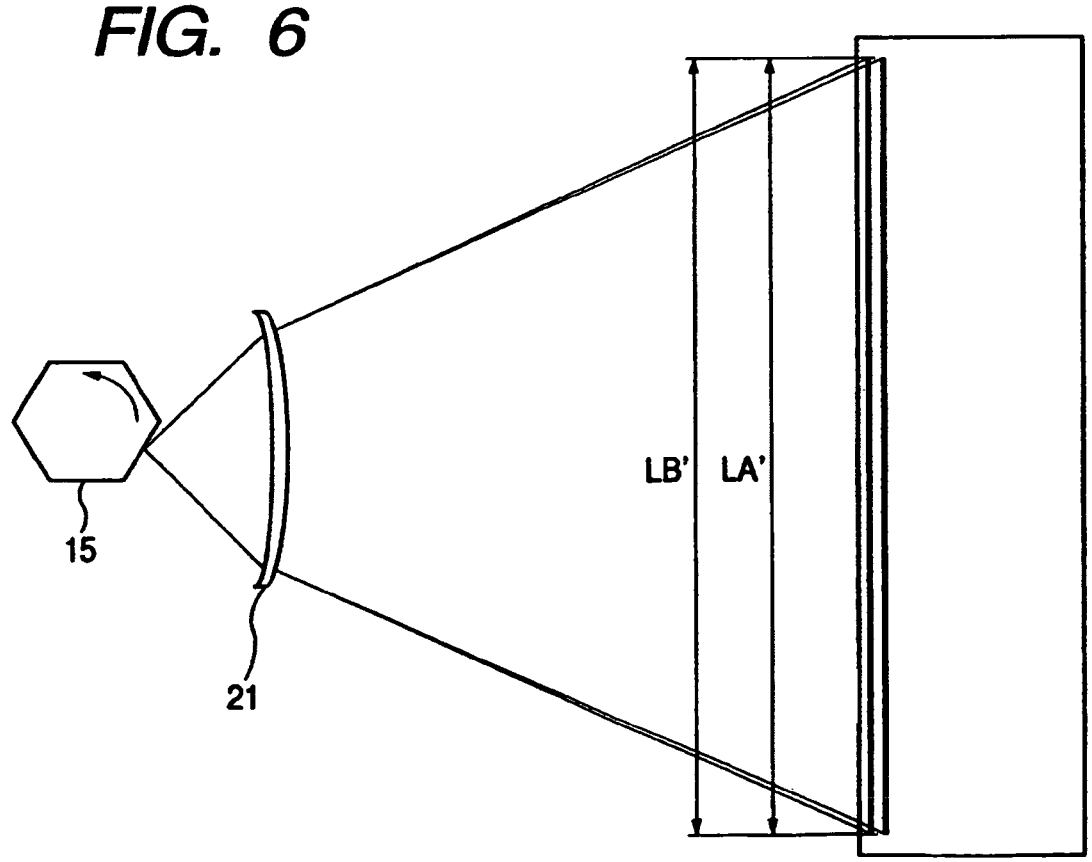
FIG. 6 is a construction view showing the optical path of an embodiment of the present invention.
Figure 9B:
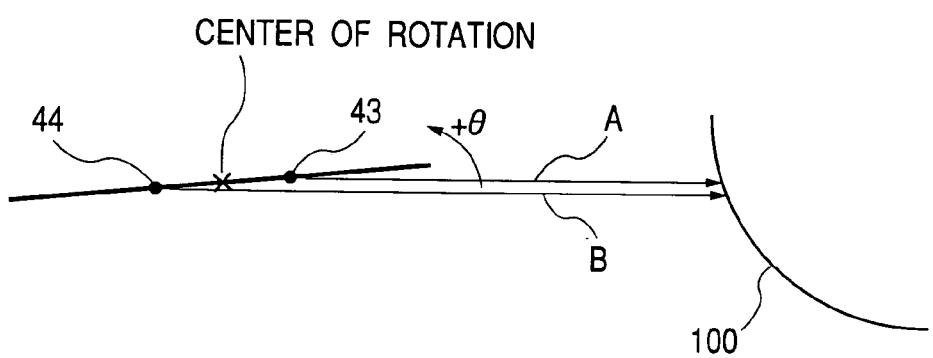
Figure 9C:
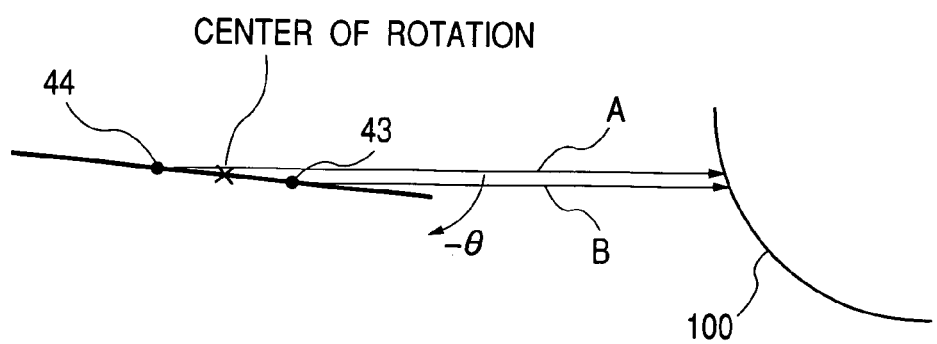

A converse case is shown in FIG. 9C. In FIG. 9C, the laser diode is rotated by an angle of −θ so that the laser beam generated from the laser beam emitting point 43 may have a long optical path to the photosensitive member 100 and that the laser beam generated from the laser beam generating point 44 may have a short optical path to the photosensitive member 100, whereby it becomes possible to adjust the interval between the two scanning lines so as to be about 42.3 µm. This adjusted state is shown in FIG. 6.

When thereby, the wavelength of the laser beam generated from the laser beam emitting point 43 is longer than the wavelength of the laser beam generated from the laser beam emitting point 44, the laser diode is rotated by the angle of +θ as shown in FIG. 9B, whereby the laser beam generated from the laser beam emitting point 43 comes to have a short optical path A to the photosensitive member 100, and the laser beam generated from the laser beam emitting point 44 comes to have a long optical path B to the photosensitive member 100 and therefore, the relative difference between the length of the line scanned on the photosensitive member 100 by the laser beam generated from the laser beam emitting point 43 and the length of the line scanned on the photosensitive member 100 by the laser beam generated from the laser beam emitting point 44 becomes small, and it becomes possible to achieve an improvement in the quality of image.

The measurement of the magnitudes of the wavelengths is effected with a wavelength measuring apparatus inserted in the optical path. The aforedescribed rotating operation of the laser chip is performed on the basis of the result of this measurement.

Also, when the wavelength of the laser beam generated from the laser beam emitting point 43 is shorter than the wavelength of the laser beam generated from the laser beam emitting point 44, the laser diode is rotated by the angle of −θ as shown in FIG. 9C, whereby the laser beam generated from the laser beam emitting point 44 comes to have the short optical path A to the photosensitive member 100, and the laser beam generated from the laser beam emitting point 43 comes to have the long optical path B to the photosensitive member 100 and therefore, the relative difference between the length of the line scanned on the photosensitive member 100 by the laser beam generated from the laser beam emitting point 43 and the length of the line scanned on the photosensitive member 100 by the laser beam generated from the laser beam emitting point 44 becomes small, and likewise it becomes possible to achieve an improvement in the quality of image.

As described above, according to the present invention, even if the laser beams emitted from two laser sources have a difference in wavelength therebetween, the imaging magnifications on the photosensitive member can be made coincident with each other.

What is claimed is:

1. A laser exposing apparatus comprising
a first laser source emitting a first laser beam;
a second laser source emitting a second laser beam shorter in wavelength than the first laser beam;
optical means for directing the first laser beam and the second laser beam to a photosensitive member; and
adjusting means for selectable adjustment of respective optical path lengths of the first and second laser beams so that the optical path length of the first laser beam is set to be relatively shorter than the optical path length of the second laser beam which is set to be relatively longer,
wherein optical paths having shorter and longer optical path lengths from the respective laser source to the photosensitive member are arranged consecutively, and said adjusting means sets the longer optical path length to the optical path of the second laser beam.

2. A laser exposing apparatus according to claim 1, wherein the first laser source and the second laser source are provided in a semiconductor chip.

3. A laser exposing apparatus according to claim 2, wherein said adjusting means has a rotating mechanism for rotating the semiconductor chip with substantially a center between the first laser source and the second laser source as the center of rotation.

4. A laser exposing apparatus according to claim 1, wherein said optical means comprises lenses having refractive indices that differ depending on wavelength.

* * * * *